United States Patent Office 3,261,677
Patented July 19, 1966

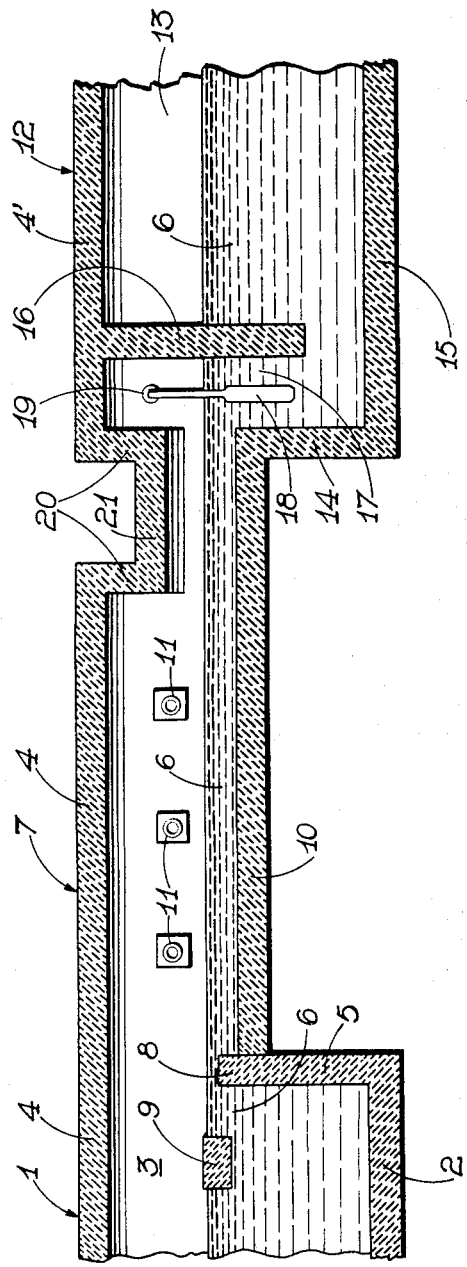

3,261,677
GLASS FURNACE HAVING A REFINING CHAMBER FOR THE MOLTEN GLASS
Emile Plumat, Gilly, Belgium, assignor to Glaverbel, Brussels, Belgium, a Belgian company
Filed Jan. 2, 1963, Ser. No. 249,011
Claims priority, application Belgium, Jan. 11, 1962, 488,531, Patent 612,555
8 Claims. (Cl. 65—346)

The present invention relates to a continuous glass-melting furnace having a porticular chamber in which the refining of the molten glass is carried out.

Continuous melting furnaces generally comprise an intermediate refining zone between the melting zone and the thermal conditioning zone for the glass, in which the said glass is freed from the gas bubbles which it contains. In the refining zone, the thickness of the glass bath is considerable and generally equal to or only slightly different from that of the melting zone. The refining zone is traversed by convection currents; more especially the glass of the upper layers descends towards the bottom of the furnace and returns towards the melting zone in order there to undergo a fresh heating. These convection currents not only cause a loss of heat but seriously interfere with the rise of the gas bubbles, by returning bubbles which were on the point of reaching the bath surface towards the lower layers. On the other hand, the rise of bubbles from the lower layers is very slow, since they must travel through a considerable distance in a glass, which is more viscous as it is closer to the bottom, and this retards its speed of ascent so that some of the glass can pass into the thermal conditioning zone before it has been freed from all its bubbles. In addition, the convection currents in the refining zone are the source of thermal heterogeneities, which are the cause of well-known disadvantages at the time of shaping.

Attempts have already been made to carry out the refining of the glass by causing it to flow in a thin layer, but the arrangements proposed for this purpose have not given satisfactory results. In accordance with certain proposals, after having caused the glass to cover a certain distance as a thin layer, the glass is made to enter directly a deep zone. The pouring or discharge of the glass into the deep zone causes eddies and vertical currents therein, the effect of which is to cause colder glass which has stayed for a relatively long time in the calm zones to return into the molten glass mass coming from the thin layer. On the other hand, convection currents which originate in this deep zone are mixed with the glass of the thin layer, which they locally cool, thus creating therein thermal heterogeneities. Furthermore, the atmosphere of the melting chamber is generally isolated from that of the refining chamber and it is frequently necessary to reheat the glass in this latter chamber; however, this reheating also assists the formation of convection currents.

In the glass furnace according to the invention, the refining chamber is of small depth and enables the thermal conditioning chamber and indirectly the glass-withdrawal chamber to be supplied with a regular glass flux which is thermally homogeneous and does not cause any eddies or vertical current. In addition, the refining chamber takes advantage of the heat of the melting chamber and normally does not require any supplementary heating for maintaining a suitable temperature therein.

According to the invention, the refining chamber is separated from the thermal conditioning chamber by a partition extending to a considerable depth into the glass of the thermal conditioning chamber and forming a narrow vertical passage which opens near the base of this chamber. The distance between this partition and the front wall of the thermal conditioning chamber is preferably less than half the height of the narrow passage.

The refining chamber, into which the glass flows as a wide stream of small depth, advantageously comprises on a part of its length a depressed arch which separates the atmosphere of this chamber from that above the narrow vertical passage and receives the radiation of the molten glass, with the effect of initiating the cooling of this latter. A device for agitating the glass may be located in this narrow vertical passage, such as for example a vertical blade which is capable of being moved from one lateral wall of the furnace to the other, and vice versa.

The refining chamber is preferably separated from the melting chamber by a sill, the crest of which is disposed just below the surface of the molten glass, and the float or the conventional dam is disposed upstream of this sill and at a small distance from the latter.

The glass coming from the melting chamber, freed by the float or the dam from impurities floating on its surface, enters the refining chamber by way of the sill, which cuts out all the convection currents and thus prevents the return of the glass into the melting chamber. In the refining chamber, the glass is spread out in a wide and thin layer preventing the formation of an appreciable temperature gradient; the glass remains exposed to the very hot atmosphere of the melting chamber and as a consequence maintains its highly fluid nature. This assists the easy rise and escape of the gas occlusions, and the reaction between the constituents of the glass can be completed under favourable conditions. The narrow vertical passage brings the refined glass to the bottom of the thermal conditioning chamber, after having been homogenized by the agitation to which it has been subjected in this passage. The latter avoids the eddies with badly defined vortices which would inevitably be produced if the glass were simply poured from one chamber to the other. Furthermore, the velocity of the molten glass in the narrow passage is fairly considerable, exceeding that of the convection currents, this making impossible any return of glass into the refining chamber. There are thus obviated any return of the glass towards the preceding chamber and the heat losses which are a consequence thereof.

The accompanying drawing is a partial longitudinal section of a furnace and shows by way of example one preferred embodiment of the invention.

The melting chamber 1 is defined by the base 2, the lateral walls 3, the arch 4 and the transverse wall 5 extending upwardly until close to the surface of the glass bath 6 so as to form a sill 8 at the entry to the refining chamber 7, the height of said sill being such that the thickness of the glass passing thereover is of the order of a few centimetres. A dam or barrier 9 is disposed upstream of the sill 8 at a small distance from the latter. The refining chamber 7 is formed by the extension of the walls 3 and of the arch 4 of the melting chamber 1 and by the base 10, which is raised so as to give the layer of glass 6 in this compartment a reduced height.

Burners 11 may be provided in the walls 3 of the chamber 7. However, these burners will only be used occasionally, for example, when starting up the furnace, as the heat of the atmosphere in the melting chamber, which has free access to the refining chamber, will normally be sufficient to maintain the glass of this latter chamber at a favourable temperature.

The thermal conditioning chamber 12 comprises the lateral walls 13, a transverse wall 14 and the base 15, the effect of the latter being below the level of the base 10 of the refining chamber 7 giving the conditioning chamber 12 a depth suitable for the conditioning and the withdrawal of the glass. In the example illustrated in the drawing, the base 15 of the conditioning chamber 12 is approximately at the level of the base 2 of the melting zone 1. A partition 16, which can start from the arch 4', extends to considerable depth into the glass 6 of the conditioning chamber 12 so as to form with the wall 14 a narrow vertical passage 17 through which the glass is brought to the bottom of the chamber 12. An agitator, comprising for example a blade 18 fixed to a horizontal arm 19, is capable of being moved with a horizontal reciprocatory movement in the glass in the passage 17.

Finally, in order to prevent the radiation from the atmosphere of the refining chamber 7 towards the passage 17 and the partition 16, the arch 4 is interrupted at the end of the chamber 7 by the walls 20 and the depressed arch 21, which is disposed close to the surface of the glass bath 6 and thermally separates the thermal conditioning chamber from the other parts of the furnace.

It is obvious that the invention is not limited to the embodiment which has been described and illustrated by way of example, and it would not be a departure from the scope thereof to incorporate modifications therein.

I claim:

1. In a glass furnace having a melting chamber, a thermal conditioning chamber, and a refining chamber positioned between the other two chambers, all chambers having separate bases and a coextensive arch, the improvement in combination therewith comprising said thermal conditioning base being positioned at a substantially lower level than said refining chamber base, a vertical wall connecting the bases of said refining and thermal conditioning chambers, a partition extending vertically downward from the arch to a point below said refining chamber base and near said conditioning chamber base, said partition spaced from said vertical wall to form a narrow vertical passageway therewith and to form an outlet with said conditioning chamber base, whereby when said furnace is operating with molten glass there will be a shallow pool of molten glass in said refining chamber and a deep pool of molten glass in said conditioning chamber, said molten glass will pass downwardly in said vertical passage and enter said conditioning chamber in a substantially horizontal direction along said base thereof.

2. The glass furnace of claim 1, wherein the distance between said partition and said vertical wall is less than half the height of said narrow vertical passageway.

3. The glass furnace of claim 1 additionally comprising a depressed arch portion over said refining chamber adjacent said thermal conditioning chamber which protects said narrow vertical passage from the atmosphere and radiation of said refining chamber.

4. The glass furnace of claim 1 additionally comprising means for agitating molten glass in said narrow vertical passage.

5. The glass furnace of claim 4 wherein said agitating means is a vertical blade capable of lateral movement from side to side of said furnace.

6. The glass furnace of claim 1 additionally comprising a sill positioned between said melting and refining chambers, the crest of which is disposed immediately below the surface of the molten glass.

7. The glass furnace of claim 6 additionally comprising a float positioned a small distance upstream to said sill.

8. The glass furnace of claim 1 wherein the base of said melting chamber is positioned at a substantially lower level than said refining chamber base whereby said molten glass will form a deep pool in said melting chamber.

References Cited by the Examiner

UNITED STATES PATENTS

| | | | |
|---|---|---|---|
| 1,414,008 | 4/1922 | Brown | 65—178 X |
| 1,999,762 | 4/1935 | Howard | 65—346 X |
| 2,042,852 | 6/1936 | Koupal | 65—347 X |
| 2,203,269 | 6/1940 | Mulholland | 65—335 X |

DONALL H. SYLVESTER, *Primary Examiner.*

A. D. KELLOGG, *Assistant Examiner.*